(No Model.)
B. J. BROWN, Jr.
CONE FOR FORMING HAT BODIES.
No. 464,421. Patented Dec. 1, 1891.
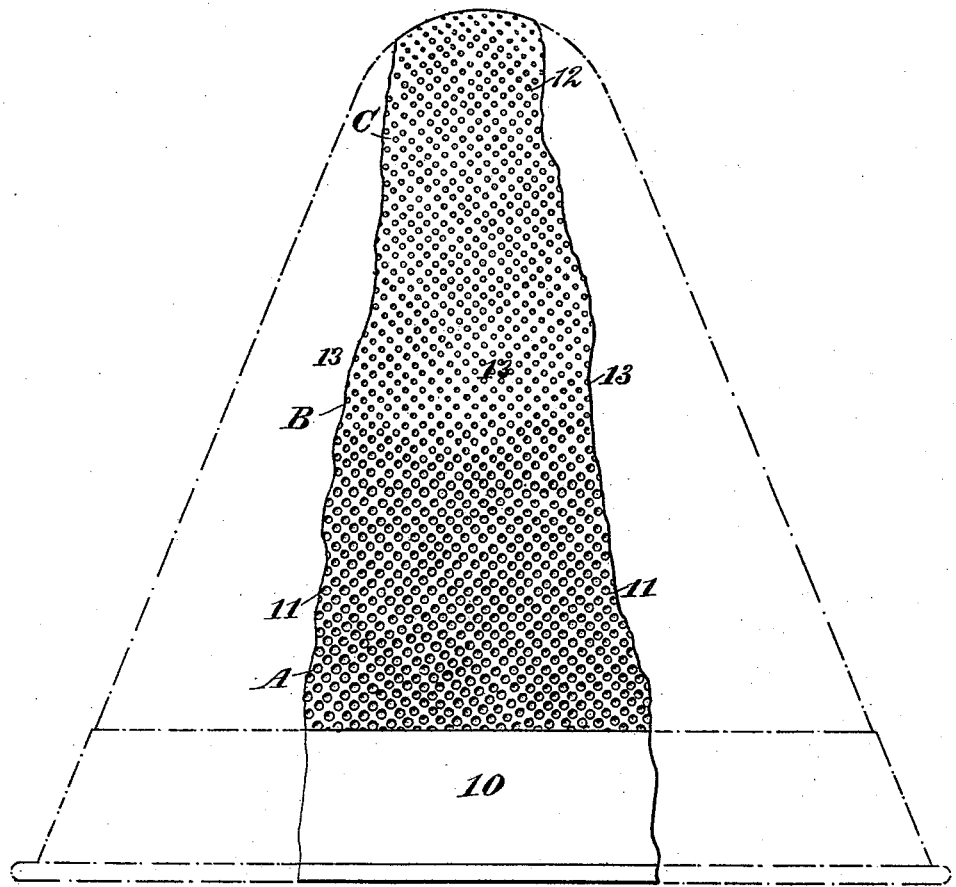
WITNESSES:
INVENTOR:
BY
ATTORNEYS

UNITED STATES PATENT OFFICE.

BENJAMIN JAMES BROWN, JR., OF BROOKLYN, NEW YORK.

CONE FOR FORMING HAT-BODIES.

SPECIFICATION forming part of Letters Patent No. 464,421, dated December 1, 1891.

Application filed April 3, 1891. Serial No. 387,503. (No model.)

*To all whom it may concern:*

Be it known that I, BENJAMIN JAMES BROWN, Jr., of Brooklyn, in the county of Kings and State of New York, have invented a new and Improved Cone for Forming Hat-Bodies, of which the following is a full, clear, and exact description.

My invention relates to an improvement in cones for forming hat-bodies from fur, wool, or a mixture with either as an element, and is of a like nature with the invention for which Letters Patent were applied for April 13, 1891, Serial No. 388,715.

The invention has for its object to dispense with the necessity of a brim-board of any description to break the draft, and to provide a cone by which when suction is applied and material fed thereto said material will be absorbed in such manner as to produce a hat-body having a brim-section of a uniform and greater thickness than the crown-section, the thickness of the latter being also uniform, and also, if desired, cause the brim-section to gradually taper off into the crown-section.

A further object of the invention is to so construct the cone that each hat-body formed thereon will be of the same thickness.

The invention consists in the novel construction of the cone, as will be hereinafter fully set forth, and pointed out in the claims.

Reference is to be had to the accompanying drawing, forming a part of this specification, which represents the entire cone in dotted lines, a vertical section of the cone being illustrated in full lines.

The cone may be constructed of any desired material; but metal is preferably employed, and the entire surface of the cone is perforated except a narrow section 10. The perforations 11 at the base of the cone are of greater diameter and are more closely grouped than those at the center and top. The perforations 12 at the upper portion of the cone are the smallest in diameter, and the central perforations 13 vary in size between the sizes of the upper and lower perforations. Thus the cone proper may be said to consist of three belts of perforations A, B, and C. The lower belt A is of sufficient width to form the brim-section only of a hat-body. The size of the upper belt C essentially corresponds to that of the crown-section of the hat-body and the intermediate belt B is quite narrow. The perforations in the lower belt A are placed about eighty-one to the square inch, and the diameters of the perforations are about seventy-eight-thousandths of an inch. The diameter of the upper perforations is about fifty-seven-thousandths of an inch, and they are arranged about seventy-two to the square inch. The perforations of the central belt B are graduated, so as to connect the upper and lower belts and prevent a ridge being formed in the hat-body. It is evident that when suction is applied to the cone in the usual manner and the fur, wool, or other material is allowed to float around the cone a greater quantity of material will be caused to adhere to the belt A of the cone than to the upper belt C, as the perforations therein are so much larger and are much more closely grouped. It is also evident that each hat-body formed upon the cone will be of uniform thickness in its several parts, which, under the present system of forming hat-bodies, is a result almost impossible to attain.

Having thus described my invention, what I claim as new, and desire to secure by Letters Patent, is—

1. A cone for forming hat-bodies, having a greater area of openings in a certain space as to a square inch, said space being located in a predetermined portion of its surface than at any other portion of the cone-surface, substantially as described.

2. A cone for forming hat-bodies, having the perforations therein of different diameters, as and for the purpose set forth.

3. A cone for forming hat-bodies, provided with belts of perforations of different diameters, the said belts being so arranged as to regulate the suction and form a hat-body thicker in one portion than in another portion, as and for the purpose set forth.

4. A cone for forming hat-bodies the perforations in which are graded in diameter, being largest at its base and smallest at its top, as and for the purpose set forth.

BENJAMIN JAMES BROWN, JR.

Witnesses:
BENJ. J. BROWN,
JOHN MALCOLM.